United States Patent Office 3,459,956
Patented Aug. 5, 1969

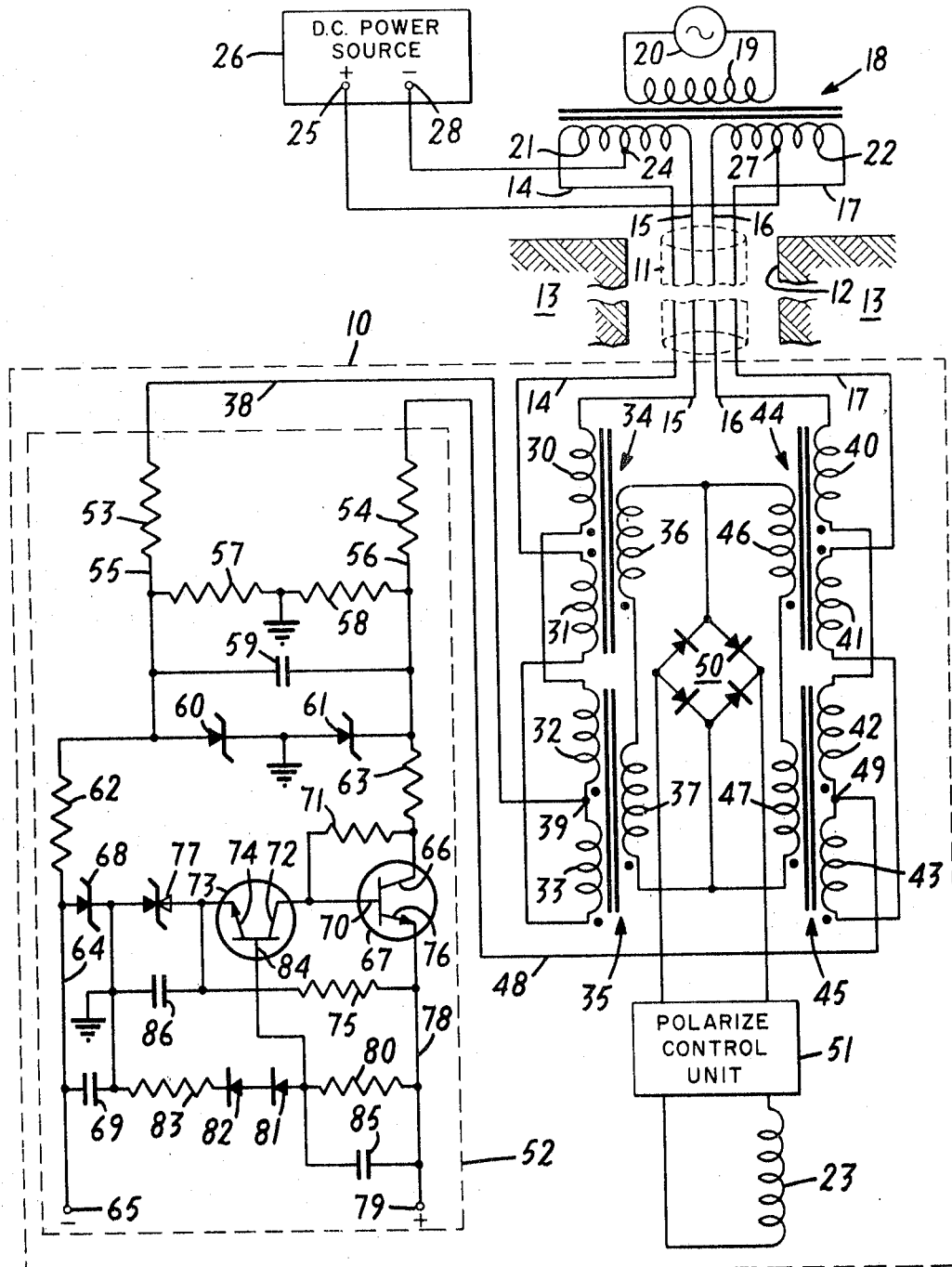

3,459,956
POWER SUPPLY SYSTEM FOR WELL LOGGING
George W. Brock, Houston, Tex., assignor to Schlumberger Technology Corporation, Houston, Tex., a corporation of Texas
Filed Aug. 25, 1966, Ser. No. 575,035
Int. Cl. H02j 3/02
U.S. Cl. 307—22                          5 Claims

ABSTRACT OF THE DISCLOSURE

In the particular embodiment of the invention described herein, alternating current is transmitted to an instrument in a well bore over two pairs of conductors connected to two transformer secondaries and a direct current source is connected between center taps on the transformer secondaries. Within the instrument four transformers have windings with taps arranged to separate the alternating current power and the direct current power.

---

This invention relates to systems for supplying power to an instrument within a well bore and, more particularly, to a new and improved power supply system providing both A.C. and D.C. power over the same conductors.

In well logging operations wherein a downhole instrument supported by a multiconductor cable is supplied with different types of electric power, the number of cable conductors normally required to transmit the power may exceed the number of available conductors in the cable. For example, in nuclear magnetism logging wherein free protons in the formation adjacent to the well bore are polarized by a very strong magnetic field generated within the instrument, four cable conductors are often utilized to supply the polarizing power from the surface of the earth because of the high current requirements. In such cases, there may be an insufficient number of conductors in the cable to supply the other types of power required by the instrument and also provide the proper number of channels for relaying detected information to the surface of the earth.

Accordingly, it is an object of the present invention to provide a new and improved power supply system for well logging which overcomes the above-mentioned disadvantages of present systems.

Another object of the invention is to provide a new and improved power supply system providing different types of power over the same conductors.

These and other objects of the invention are attained by providing two pairs of conductors for transmission of alternating current power and a coupling arrangement for coupling direct current power to the conductors of each pair equally, the polarity of the coupling being opposite for one pair of conductors with respect to the other pair. In a particular embodiment of the invention, alternating current power is supplied to two pairs of conductors in a cable from two isolated secondary transformer windings and the opposite terminals of a direct current power source are joined to center taps on the two secondaries, respectively. At the other end of the cable, the conductor pairs are coupled to transformers and to a direct current power supply in such manner that variations in the direct current power drawn through the cable have no effect on the alternating current circuit. In addition, a direct current power regulator is preferably provided to eliminate variations in D.C. power which may result from transmission through the cable.

Further objects and advantages of the invention will be apparent from a reading of the following description in conjunction with the accompanying drawing which is a schematic circuit diagram illustrating a representative embodiment of the invention arranged for use in connection with well logging apparatus.

In the typical power supply system shown in the drawing, a nuclear magnetism well logging instrument 10 is suspended by a cable 11 within a well bore 12 which passes through earth formations 13. In addition to other conductors which are not illustrated, the cable 11, which may be, for example, from 5,000 to 25,000 feet long, includes four power supply conductors 14, 15, 16 and 17.

At the surface of the earth, alternating current power is supplied equally to the two pairs of conductors 14, 15 and 16, 17 by a transformer 18 having a primary winding 19 connected to an alternating current power source 20 and two identical isolated secondary windings 21 and 22 connected across these conductor pairs, respectively. Inasmuch as the alternating current power applied to these conductors is utilized in the instrument 10 to energize a polarizing coil 23 with a current which is on the order of 5 to 10 amperes, the required current capacity of the conductors is reduced by utilizing two conductor pairs in parallel. In addition, the A.C. voltage applied to the conductors, which may, for example, be 1,000 volts, is substantially higher than that required to energize the polarizing coil 23 so that the current requirements are correspondingly reduced.

Also, to provide the downhole instrument 10 with direct current power to energize electronic circuit components, for example, the secondary winding 21 has a center tap 24 which is connected to the negative terminal 28 of a D.C. power supply 26 and the winding 22 has a center tap 27 connected to the positive terminal 25. Inasmuch as the windings 21 and 22 are identical and the taps 24 and 27 are at the center, direct current supplied from the source 26 will affect both halves of each winding equally and will, therefore, have no influence on the operation of the transformer. For the same reason, equal proportions of the direct current power are carried by all of the conductors 14, 15, 16 and 17, and, therefore, will have no effect on the transmission of the alternating current power.

Within the downhole instrument 10, the conductors 14 and 15 are connected in series across two pairs of identical primary windings 30 and 31 and 32 and 33 in two transformers 34 and 35, respectively, the connections being made from the conductor 15 through the winding 30, then through the windings 32 and 33, and finally back through the winding 31 to the conductor 14. As indicated by the dot notation, the windings are oriented so as to induce additive potentials in the secondary windings 36 and 37 of the transformers as a result of alternating current flow in the conductors 14 and 15. A conductor 38, connected to the junction 39 between the windings 32 and 33, draws direct current from both conductors 14 and 15 equally and inasmuch as the identical windings 30, 31, 32 and 33 are oppositely wound with respect to currents flowing in the same direction from each of the conductors 14 and 15 to the junction 39, the direct current supplied to the conductor 38 has no effect upon the potential induced in the secondary windings 36 and 37.

In the same manner, the conductors 16 and 17 are connected in series across two pairs of identical primary windings 40 and 41 and 42 and 43 in two further transformers 44 and 45, respectively, the connections being made from the conductor 16 through the winding 40, then through the windings 43 and 42, and finally back through the winding 41 to the conductor 17. These windings are also oriented as indicated by the dot notation to induce additive potentials in the secondary windings 46 and 47 of the transformers 44 and 45, respectively, in response to the alternating current flow in the conductors 16 and 17. Furthermore, a conductor 48 is connected to the junction 49 between the windings 42 and 43 to provide the other direct current output conductor, the direct current drawn through the primary windings being ineffective with respect to the secondary windings.

To supply direct current power to the polarizing coil 23, the secondaries 36 and 37 and 46 and 47 are connected in parallel to a full wave rectifier 50 and the output from the rectifier is joined through a polarize control unit 51 to the coil 23. The control unit 51 may control the energization of the coil 23 in any conventional manner and inasmuch as the particular manner of polarizing coil energization forms no part of the present invention, it will not be described in detail.

In order to regulate the direct current power supplied to the instrument 10, a power regulator 52 receives D.C. power from the negative and the positive conductors 38 and 48 through identical input resistors 53 and 54 connected in series to corresponding conductors 55 and 56, respectively. Two further resistors 57 and 58 connect the conductors 55 and 56 to ground and a filter capacitor 59 is joined across the conductors to reduce any alternating current ripple. To limit the maximum deviation of the potential of each of these conductors with respect to ground and thereby prevent extreme voltages from being applied to the subsequent components, a 33-volt Zener diode 60 and a 47-volt Zener diode 61 are connected between the conductors 55 and 56, respectively, and ground. Thereafter, two series resistors 62 and 63 join the conductors 55 and 56 to a negative output conductor 64 leading to a negative terminal 65 and to the collector electrode 66 of an emitter output series regulator transistor 67.

To maintain the negative terminal 65 at the desired negative voltage, a 24-volt Zener diode 68 of manufacturer's type designation 1D24B is connected between the conductor 64 and ground and, to smooth out any remaining A.C. ripple, a capacitor 69 is also connected between the conductor 64 and ground. The transistor 67 has its base electrode 70 joined through a resistor 71 to its collector electrode 66 and also to the collector electrode 72 of another transistor 73, both transistors being of the type designated 2N2102. Also, the emitter electrode 74 of the transistor 73 is connected by a resistor 75 to the emitter electrode 76 of the transistor 67 and leads to ground through a temperature-compensated Zener diode combination 77 which holds the emitter 74 at a constant voltage regardless of ambient temperature variations. This diode may be of the type designated 1N1735. A positive voltage output conductor 78 leads from the emitter 76 to a terminal 79 and this conductor is connected to ground through a voltage divider consisting of a resistor 80, two 1N914 diodes 81 and 82 and another resistor 83, the base electrode 84 of the transistor 73 being connected between the resistor 80 and the diode 81. Finally, to filter out any A.C. ripple, a capacitor 85 is connected between the positive conductor 78 and the base electrode 84 and another capacitor 86 is joined between the resistor 75 and ground.

In a representative embodiment of the invention, the various components shown in the drawing had the following values to provide 24-volt regulated positive and negative D.C. power:

Resistors:
```
53 and 54 _____ohms__    250
57 and 58 _____do____ 10,000
62 _____do____  1,500
63 _____do____    475
75 _____do____  3,650
80 _____do____ 20,000
83 _____do____  6,650
```
Capacitors:
```
59 _____microfarads__ 110
69 _____do____  25
85 _____do____  4.7
86 _____do____   22
```

In operation, the A.C. power source 20, which may, for example, be a 110-volt source, energizes the transformer 19 providing approximately 1,000 volts A.C. across each of the secondary windings 21 and 22 and the conductor pairs 14, 15 and 16, 17. At the same time, the D.C. power source 26 supplies approximately 150 volts D.C. across the center taps of the windings. Because of line losses in the cable 11, the A.C. voltages are reduced by about fifty percent so that approximately 500 volts appears between each of the conductor pairs 14–15 and 16–17 at the lower end of the cable 11. Very little D.C. voltage is dropped in the cable 11 because of the low D.C. current drain, on the order of 40 milliamperes. The secondary windings 36, 37 and 46, 47 step this voltage down further while increasing the current, so that sufficient direct current is available from the rectifier 50 to provide the required polarizing field strength from the coil 23 under the control of the unit 51.

At the same time, the D.C. voltage taken from the lines 14, 15, 16 and 17 through the primary windings in the transformers 34, 35 and 44, 45 by the conductors 38 and 48 is supplied to the voltage regulator unit 52. Within this unit, the conductor 55 is held at 33 volts negative by the Zener diode 60 and the positive conductor is held at 47 volts positive by the Zener diode 61. Inasmuch as the negative 24-volt power is not required to be controlled as accurately as the positive D.C. power for the particular application described here, the 24-volt Zener diode 68 receiving current from the conductor 55 through the dropping of the resistor 62 is sufficient.

For the positive voltage D.C. power, the temperature-compensated diode 77 in conjunction with the transistors 67 and 73 provides more accurate regulation. In this regard, with the emitter 74 of the transistor 73 held at a constant voltage by the diode 77, whenever the voltage at the emitter 76 of the transistor 67 becomes more positive than 24 volts, more current will be drawn through the transistor 73 by the increase in the potential of its base electrode 84 which is connected to the voltage divider resistor 80. Increased current flow through this transistor reduces the voltage at the base electrode 70 of the transistor 67 because of the increased current drawn through the resistor 71. As a result, the voltage at the emitter electrode 76 will be reduced to the desired value of 24 volts. Conversely, a decrease in the voltage at the base electrode 84 of the transistor 73, resulting from a lowered potential at the emitter 76, reduces the current drawn by the transistor 73 through the resistor 71 causing the voltage at the base electrode 70 to rise. This, in turn, raises the voltage at the emitter 76 to the desired value. The diodes 81 and 82 provide temperature compensation for base-to-emitter junction voltage changes in the transistors 67 and 73.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. Electric power supply apparatus comprising two pairs of conductors, first coupling means for coupling alternating current power to both pairs of conductors independently but with substantially identical current characteristics, second coupling means for coupling direct current power to both pairs of conductors with opposite polarity but with substantially identical current characteristics to the conductor pairs, respectively, third coupling means including alternating current power output means coupled to both conductor pairs to provide substantially identical current response characteristics and responsive to similar energization of both conductor pairs with the polarity of the conductors in each pair being opposite and substantially nonresponsive to opposed energization of the conductor pairs with the conductors of each pair having the same polarity, and direct current power output means connected to both conductor pairs in opposed potential relation with the same polarity coupling to both conductors in each pair.

2. Electric power supply apparatus according to claim 1 wherein the first coupling means comprises transformer means including identical output winding means connected to each pair of conductors in the same manner and the second coupling means comprises conductor means connected to center taps on the two winding means, respectively, and adapted to be connected to opposite terminals of a direct current power source.

3. Electric power supply apparatus according to claim 1 wherein the third coupling means comprises transformer means connected to each conductor pair and responsive to current flowing in opposite directions in the conductors of the pair and substantially non-responsive to identical currents flowing in the same direction in the conductors of each pair.

4. Electric power supply apparatus according to claim 1 wherein the direct current power output means comprises voltage regulator means for providing a constant voltage output despite variations in direct current power received from the conductor pairs by the power output means.

5. Electric power supply apparatus according to claim 4 wherein the voltage regulator means includes temperature-compensated Zener diode means establishing a reference voltage point and transistor means connected between the reference voltage point and an output conductor and responsive to variations in the potential between the output conductor and the reference point to alter the potential of the output conductor in opposition to such variation.

References Cited

UNITED STATES PATENTS

| 3,121,840 | 2/1964 | Lamb | 340—18 X |
| 3,223,968 | 12/1965 | Shazo | 340—18 |
| 3,309,657 | 3/1967 | Rabson et al. | 340—18 |
| 3,340,500 | 9/1967 | Boyd et al. | 340—18 |

ROBERT K. SCHAEFER, Primary Examiner

H. J. HOHAUSER, Assistant Examiner

U.S. Cl. X.R.

340—18